US009950962B2

United States Patent
Kobayashi

(10) Patent No.: US 9,950,962 B2
(45) Date of Patent: Apr. 24, 2018

(54) CUBIC BORON NITRIDE SINTERED BODY AND COATED CUBIC BORON NITRIDE SINTERED BODY

(71) Applicant: TUNGALOY CORPORATION, Iwaki-shi (JP)

(72) Inventor: Kota Kobayashi, Iwaki (JP)

(73) Assignee: TUNGALOY CORPORATION, Iwaki-Shi, Fukushima (JP)

( * ) Notice: Subject to any disclaimer, the term of this patent is extended or adjusted under 35 U.S.C. 154(b) by 86 days.

(21) Appl. No.: 15/030,134

(22) PCT Filed: Oct. 22, 2014

(86) PCT No.: PCT/JP2014/078018
§ 371 (c)(1),
(2) Date: Apr. 18, 2016

(87) PCT Pub. No.: WO2015/060320
PCT Pub. Date: Apr. 30, 2015

(65) Prior Publication Data
US 2016/0236988 A1    Aug. 18, 2016

(30) Foreign Application Priority Data
Oct. 22, 2013   (JP) ................................. 2013-218813

(51) Int. Cl.
```
C04B 41/87        (2006.01)
C04B 35/5831      (2006.01)
C04B 41/00        (2006.01)
C04B 41/50        (2006.01)
C04B 35/63        (2006.01)
C04B 35/638       (2006.01)
C04B 35/645       (2006.01)
```
(52) U.S. Cl.
CPC ...... *C04B 35/5831* (2013.01); *C04B 35/6303* (2013.01); *C04B 35/638* (2013.01); *C04B 35/645* (2013.01); *C04B 41/009* (2013.01); *C04B 41/5068* (2013.01); *C04B 41/87* (2013.01); *C04B 2235/386* (2013.01); *C04B 2235/3865* (2013.01); *C04B 2235/3886* (2013.01); *C04B 2235/402* (2013.01); *C04B 2235/404* (2013.01); *C04B 2235/5436* (2013.01); *C04B 2235/5445* (2013.01); *C04B 2235/785* (2013.01); *C04B 2235/786* (2013.01); *C04B 2235/80* (2013.01); *C04B 2235/9607* (2013.01)

(58) Field of Classification Search
USPC .......... 51/307, 309; 428/325, 336, 697, 698, 428/699, 701, 702, 704
See application file for complete search history.

(56) References Cited

U.S. PATENT DOCUMENTS

| | | | |
|---|---|---|---|
| 5,466,642 A | 11/1995 | Tajima et al. | |
| 5,882,777 A | 3/1999 | Kukino et al. | |
| 7,902,098 B2 * | 3/2011 | Noda | B23B 27/148 428/367 |
| 2010/0313489 A1 | 12/2010 | Teramoto et al. | |
| 2013/0034712 A1 * | 2/2013 | Kudoh | C04B 35/5831 428/323 |

FOREIGN PATENT DOCUMENTS

| | | | |
|---|---|---|---|
| JP | 1978-077811 | | 7/1978 |
| JP | 03-020437 | * | 1/1991 |
| JP | 07-082031 | * | 3/1995 |
| JP | 1995-082031 | | 3/1995 |
| JP | 2001-179508 | * | 7/2001 |
| JP | 2007-254249 | | 10/2007 |
| JP | 2008-208028 A | | 9/2008 |
| JP | 2011-212832 A | | 10/2011 |
| JP | 2012-232348 | | 11/2012 |

OTHER PUBLICATIONS

Extended European Search Report dated May 12, 2017, issued in counterpart European application (No. EP 14855198.9).
International Search Report dated Jan. 20, 2015 issued in counterpart International (PCT) Application (No. PCT/JP2014/078018).

* cited by examiner

*Primary Examiner* — Archene Turner
(74) *Attorney, Agent, or Firm* — Foley & Lardner LLP

(57) ABSTRACT

A CBN sintered body contains CBN, a binder phase and inevitable impurities. An amount of CBN by volume is between 50%-80%. A total amount of binder phase and inevitable impurities by volume is between 20%-50%. The binder phase contains an Al compound and a Ti compound. The Al compound contains Al and one or more of N, O and B. The Ti compound contains Ti and one or more of C, N and B. When an X-ray diffraction intensity at a (100) plane of the AlN is $I_1$ and an X-ray diffraction intensity at a (104) plane of the $Al_2O_3$ is $I_2$, $I_1/I_2$ is between 6 and 40. When a total area of the cubic boron nitride and the Al compound is S1, and an area of a region at which the CBN and the Al compound are continuously contacted is S2, S2/S1 is between 0.98 and 1.00.

11 Claims, No Drawings

CUBIC BORON NITRIDE SINTERED BODY AND COATED CUBIC BORON NITRIDE SINTERED BODY

RELATED APPLICATIONS

This is a 371 US National Phase of International Patent Application No. PCT/JP2014/078018 filed Oct. 22, 2014 and published as WO 2015/060320 on Apr. 30, 2015, which claims priority to JP 2013-218813, filed Oct. 22, 2013. The contents of the aforementioned applications are incorporated by reference in their entirety.

TECHNICAL FIELD

The present invention relates to a cubic boron nitride sintered body and a coated cubic boron nitride sintered body. More specifically, it relates to a cubic boron nitride sintered body and a coated cubic boron nitride sintered body suitable for a cutting tool and a wear resistant tool.

BACKGROUND ART

Cubic boron nitride has hardness next to diamond and excellent heat conductivity. In addition, the cubic boron nitride has a characteristic that it has low affinity to iron. A cubic boron nitride sintered body comprising the cubic boron nitride and a binder phase of a metal(s) or ceramics has been applied to a cutting tool or a wear resistant tool, etc. As a prior art of the cubic boron nitride sintered body, there is a cubic boron nitride sintered body comprising cubic boron nitride, aluminum oxide, aluminum nitride and/or aluminum boride, titanium carbide, titanium nitride and/or titanium carbonitride, and titanium boride (for example, see Patent Document 1 or Patent Document 2.).

PRIOR ART DOCUMENTS

Patent Documents

Patent Document 1: JP Hei.7-082031A
Patent Document 2: JP Sho.53-077811A

SUMMARY OF THE INVENTION

Problems to be Solved by the Invention

To increase processing efficiency, cutting conditions are becoming severe than the conventional ones. In such a tendency, it has been required to further elongate the tool life. However, according to the cubic boron nitride sintered body disclosed in Patent Document 1 or Patent Document 2, fracture is generated at the tool due to the progress of the chemical reaction wear, so that the conventional ones cannot respond to such requirements sufficiently.

An object of the present invention is to provide a cubic boron nitride sintered body and a coated cubic boron nitride sintered body, which can elongate a life of a cutting tool or a wear resistant tool by improving fracture resistance thereof to solve the above problems.

Means to Solve the Problems

The present inventor has carried out studies on the cubic boron nitride sintered body. As a result, he has obtained the finding that it is important to suppress a chemical reaction in high speed processing and high efficiency processing to improve fracture resistance of the cubic boron nitride sintered body. In addition, he has also obtained the finding that, to suppress the chemical reaction wear, it is effective to improve thermal conductivity of the cubic boron nitride sintered body without lowering oxidation resistance of the cubic boron nitride sintered body. The present inventor has accomplished the present invention based on these findings.

The gist of the present invention is as follows.

(1) A cubic boron nitride sintered body which comprises
  a cubic boron nitride sintered body containing cubic boron nitride, a binder phase and inevitable impurities,
  an amount of the cubic boron nitride is 50% by volume or more and 80% by volume or less,
  a total amount of the binder phase and the inevitable impurities is 20% by volume or more and 50% by volume or less,
  the binder phase contains an Al compound and a Ti compound,
  the Al compound contains an Al element and at least one element selected from the group consisting of N, O and B,
  the Ti compound contains a Ti element and at least one element selected from the group consisting of C, N and B,
  the Al compound contains AlN and $Al_2O_3$,
  when an X-ray diffraction intensity at a (100) plane of the AlN is made $I_1$, and an X-ray diffraction intensity at a (104) plane of the $Al_2O_3$ is made $I_2$, then $I_1/I_2$ is 6 or more and 40 or less, and
  when a total area of the cubic boron nitride and the Al compound is made S1, and an area of a region at which the cubic boron nitride and the Al compound are continuously contacted is made S2, then S2/S1 is 0.98 or more and 1.00 or less.

(2) The cubic boron nitride sintered body of (1), wherein the Ti compound contains $TiB_2$, and when an X-ray diffraction intensity at a (101) plane of the $TiB_2$ is made $I_3$, then $I_3/I_1$ is 0.5 or more and 2.0 or less.

(3) The cubic boron nitride sintered body of (1) or (2), wherein an area of the Al compound is made $S_A$, and an area of the Ti compound is made $S_T$, then $S_T/S_A$ is 1 or more and 3 or less.

(4) The cubic boron nitride sintered body of any one of (1) to (3), wherein an average grain diameter of the cubic boron nitride is 0.3 μm or more and 1.5 μm or less.

(5) A coated cubic boron nitride sintered body which comprises the cubic boron nitride sintered body of any one of (1) to (4) and a film formed on a surface of the cubic boron nitride sintered body.

(6) The coated cubic boron nitride sintered body of (5), wherein the film comprises at least one element selected from the group consisting of Ti, Zr, Hf, V, Nb, Ta, Cr, Mo, W, Al and Si, and at least one element selected from the group consisting of C, N, O and B.

(7) The coated cubic boron nitride sintered body (5) or (6), wherein the film is a single layer film or a laminated film containing two or more layers.

(8) The coated cubic boron nitride sintered body of any one of (5) to (7), wherein an average film thickness of the whole film is 0.5 μm or more and 20 μm or less.

The cubic boron nitride sintered body of the present invention contains cubic boron nitride, a binder phase and inevitable impurities. An amount of the cubic boron nitride is 50% by volume or more and 80% by volume or less. A total amount of the binder phase and the inevitable impurities is 20% by volume or more and 50% by volume or less.

If the cubic boron nitride contained in the cubic boron nitride sintered body of the present invention is less than 50% by volume, and the amounts of the binder phase and the inevitable impurities exceed 50% by volume, hardness of the cubic boron nitride is insufficient. In this case, wear resistance of the cubic boron nitride sintered body is lowered.

If the cubic boron nitride contained in the cubic boron nitride sintered body of the present invention exceeds 80% by volume, and the total amount of the binder phase and the inevitable impurities is less than 20% by volume, the cubic boron nitride is chemically reacted at the time of cutting processing. In this case, fracture resistance of the tool is lowered due to insufficient strength of the edge of a blade.

An average grain diameter of the cubic boron nitride of the present invention is preferably 0.3 μm or more and 1.5 μm or less. If the average grain diameter of the cubic boron nitride is less than 0.3 μm, the cubic boron nitride is aggregated, whereby fracture resistance of the cubic boron nitride sintered body is lowered in some cases. If the average grain diameter of the cubic boron nitride exceeds 1.5 μm, a width of the binder phase becomes thick, whereby fracture resistance of the cubic boron nitride sintered body is lowered in some cases. The average grain diameter of the cubic boron nitride is further preferably 0.3 μm or more and 1.0 μm or less.

The binder phase of the present invention comprises an Al compound and a Ti compound. The Al compound comprises an Al element and at least one element selected from the group consisting of N, O and B. The Ti compound comprises a Ti element and at least one element selected from the group consisting of C, N and B.

The Al compound of the present invention is, for example, $Al_2O_3$, AlN, aluminum boride, etc. The Ti compound of the present invention is, for example, TiC, TiN, TiCN, $TiB_2$, etc.

The binder phase of the present invention may comprise the Al compound and the Ti compound alone. The binder phase of the present invention may further comprise a compound comprising at least one element selected from the group consisting of Zr, Hf, V, Nb, Ta, Cr, Mo and W, and at least one element selected from the group consisting of C, N, O and B.

The Al compound of the present invention comprises AlN and $Al_2O_3$. AlN has excellent thermal conductivity next to that of the cubic boron nitride, so that the chemical reaction wear can be suppressed. $Al_2O_3$ is excellent in oxidation resistance, and can suppress the chemical reaction wear.

An X-ray diffraction intensity $I_1$ at a (100) plane of the AlN is measured by the 2θ/θ method using the Cu-Kα line. A measurement range of the 2θ is 30° to 90°.

An X-ray diffraction intensity $I_2$ at a (104) plane of the $Al_2O_3$ is measured by the 2θ/θ method using the Cu-Kα line. A measurement range of the 2θ is 30° to 90°.

If the $I_1/I_2$ is less than 6, an amount of the AlN in the Al compound is a little, so that thermal conductivity is lowered, and the chemical reaction wear cannot be suppressed. If the $I_1/I_2$ exceeds 40, an amount of the $Al_2O_3$ in the Al compound is a little, so that oxidation resistance is lowered, and the chemical reaction wear cannot be suppressed. Therefore, the $I_1/I_2$ is preferably 6 or more and 40 or less. The $I_1/I_2$ is more preferably 6 or more and 25 or less, further preferably 8 or more and 15 or less.

When the total area of the cubic boron nitride and the Al compound is made S1, and when the area at the region that the cubic boron nitride and the Al compound are continuously contacted is made S2, then the S2/S1 is preferably 0.98 or more and 1.00 or less. If the value is 0.98 or more, heat generated at the time of cutting processing is dissipated through the cubic boron nitride and the Al compound having high thermal conductivity, so that the chemical reaction can be suppressed.

In the present invention, "the region S2 that the cubic boron nitride and the Al compound are continuously contacted" contains (1) a region that the cubic boron nitride and the Al compound are continuously contacted, (2) a region that the cubic boron nitride and the cubic boron nitride are continuously contacted, and (3) a region that the Al compound and the Al compound are continuously contacted.

Even when the cubic boron nitride is surrounded by the grains of the cubic boron nitride, the heat generated at the time of cutting processing is dissipated through the cubic boron nitride having high thermal conductivity.

Even when the Al compound is surrounded by the grains of the Al compound, the heat generated at the time of cutting processing is dissipated through the Al compound having high thermal conductivity.

When an area of the Al compound is made $S_A$ and an area of the Ti compound is made $S_T$, then, $S_T/S_A$ is preferably 1 or more and 3 or less. If the $S_T/S_A$ is less than 1, an amount of the Ti compound in the binder phase is relatively a little, so that wear resistance is lowered in some cases. If the $S_T/S_A$ exceeds 3, the Al compound is dispersed in the Ti compound, and the region at which the cubic boron nitride and the Al compound are contacted is a little, so that thermal conductivity of the cubic boron nitride sintered body tends to be lowered. The $S_T/S_A$ is further preferably 1.5 or more and 2.5 or less.

An area of the cubic boron nitride, an area of the Al compound and an area of the Ti compound can be obtained by the scanning electron microscope (SEM). Specifically, an optional sectional surface of the cubic boron nitride sintered body is photographed by the SEM. The photograph of the structure of the cubic boron nitride sintered body photographed by the SEM is analyzed by using a commercially available image analysis software. According to this procedure, the area of the cubic boron nitride, the area of the Al compound and the area of the Ti compound can be obtained. The photograph of the structure is preferably a photograph photographed by a magnification of 3,000 to 10,000-fold to minimize fluctuation of the measurement.

The Ti compound of the present invention preferably contains $TiB_2$. This is because when the Ti compound contains $TiB_2$, the cubic boron nitride and the binder phase are sufficiently reacted so that fracture resistance is excellent.

An X-ray diffraction intensity $I_3$ at the (101) plane of $TiB_2$ is measured by the 2θ/θ method using the Cu-Kα line. A measured range of the 2θ is 30° to 90°.

A ratio $I_3/I_1$ of the X-ray diffraction intensity $I_3$ at the (101) plane of $TiB_2$ and the X-ray diffraction intensity $I_1$ at the (100) plane of AlN is preferably 0.5 or more and 2.0 or less. If the $I_3/I_1$ is less than 0.5, sintering between the cubic boron nitride and the binder phase is insufficient, and fracture resistance is poor in some cases. On the other hand, if the $I_3/I_1$ exceeds 2.0, an amount of the AlN is relatively a little, so that thermal conductivity is lowered and the chemical reaction wear cannot be suppressed in some cases.

An X-ray diffraction intensity of AlN, $Al_2O_3$ and $TiB_2$ can be measured by using a commercially available X-ray diffractometer. An X-ray diffraction intensity can be measured by, for example, using an X ray diffractometer RINT TTR III manufactured by RIGAKU CORPORATION. Examples of the measurement conditions are as follows.

X-ray diffraction measurement of 2θ/θ concentrated optical system using Cu-Kα line Output: 50 kV, 250 mA
Solar slit at incident side: 5°
Divergence vertical slit: ½°
Divergence vertical limit slit: 10 mm
Scattering slit: ⅔°
Solar slit at photoreception side: 5°
Photoreception slit: 0.15 mm
BENT monochromator
Photoreception monochrome slit: 0.8 mm
Sampling width: 0.02°
Scanning speed: 2°/min
2θ measurement range: 30 to 90°

According to the above-mentioned conditions, X-ray diffraction intensities at the (100) plane of AlN, at the (104) plane of $Al_2O_3$ and the (101) plane of $TiB_2$ can be measured.

The cubic boron nitride sintered body of the present invention contains impurities inevitably. Examples of the impurities are lithium, etc., contained in the raw powder.

In general, a total amount of the inevitable impurities is 1% by mass or less based on the whole cubic boron nitride sintered body. Accordingly, the inevitable impurities hardly affect to the characteristic values of the cubic boron nitride sintered body of the present invention.

Incidentally, the cubic boron nitride sintered body of the present invention may contain a small amount of the other components than the cubic boron nitride, the binder phase and inevitable impurities.

Thermal conductivity of the cubic boron nitride sintered body of the present invention is preferably 60 W/m·K or more and 100 W/m·K or less. If the thermal conductivity is less than 60 W/m·K, a temperature of the edge of a blade at the time of cutting processing is high, so that the chemical reaction wear of the edge of a blade proceeds at an early stage. If the chemical reaction wear of the edge of a blade proceeds at an early stage, fracture resistance of the edge of a blade is lowered. If the thermal conductivity exceeds 100 W/m·K, an amount of the AlN in the Al compound becomes relatively large to that of the $Al_2O_3$. When an amount of the AlN becomes relatively large to that of the $Al_2O_3$, the chemical reaction wear of the edge of a blade proceeds at an early stage, fracture resistance of the edge of a blade is lowered in some cases.

Thermal conductivity of the cubic boron nitride sintered body of the present invention can be measured as follows.

First, thermal diffusivity of the cubic boron nitride sintered body is measured by a laser flash thermophysical property measuring apparatus.

Next, thermal conductivity can be calculated from the measured thermal diffusivity, the specific heat and the density.

The thermal conductivity can be measured, for example, as follows.

The cubic boron nitride sintered body is processed to a sample having a diameter of 10 mm and a thickness of 3 mm. A carbon spray is coated onto the sample of the cubic boron nitride sintered body.

By using a laser flash thermophysical property measuring apparatus LFA457 (Nd glass laser, laser wavelength: 1.06 μm, laser pulse width: 0.3 ms, laser pulse energy: 0 to 18 J) manufactured by NETZSCH, a temperature change at the back surface of the sample after laser heating is measured.

According to the Cowan+Pulse correction model, the measurement result of the temperature change of the sample is analyzed. According to this procedure, thermal diffusivity of the cubic boron nitride sintered body can be measured.

A temperature in the furnace is 400° C. Inside of the furnace is a nitrogen atmosphere.

Thermal diffusivity of the sample of the cubic boron nitride sintered body is measured 5 times. An average value of the 5 times measured values is calculated. The thermal conductivity can be obtained from the product of the specific heat, the average value of the thermal diffusivity and the density.

A ratio (% by volume) of the cubic boron nitride and the binder phase contained in the cubic boron nitride sintered body of the present invention can be obtained by analyzing the photograph of the structure of the cubic boron nitride sintered body photographed by SEM using a commercially available image analysis software.

An average grain diameter of the cubic boron nitride can be obtained by analyzing the photograph of the structure of the cubic boron nitride sintered body photographed by SEM using a commercially available image analysis software.

The coated cubic boron nitride sintered body of the present invention has a cubic boron nitride sintered body and a film formed onto the surface of the cubic boron nitride sintered body. When a film is formed onto the surface of the cubic boron nitride sintered body, it is preferred since wear resistance is improved.

The film of the present invention is not particularly limited so long as it is used as a film of the coated tool.

The film of the present invention preferably comprises a layer of a compound containing a first element and a second element. The film of the present invention is preferably a single layer or a laminated layer containing a plural number of layers. The first element is preferably at least one element selected from the group consisting of Ti, Zr, Hf, V, Nb, Ta, Cr, Mo, W, Y, Al and Si. The second element is preferably at least one element selected from the group consisting of C, N, O and B. When the film has such a constitution, wear resistance of the coated tool is improved.

Examples of the film are TiN, TiC, TiCN, TiAlN, TiSiN and CrAlN, etc. The film may be either a single layer or a laminated layer containing two or more layers. The film preferably has a structure in which a plural number of layers having different compositions are alternately laminated. An average film thickness of the respective layers is preferably 5 nm or more and 500 nm or less.

An average film thickness of the whole film is preferably 0.5 μm or more and 20 μm or less. If the average film thickness of the whole film is less than 0.5 μm, wear resistance is lowered. If the average film thickness of the whole film exceeds 20 μm, fracture resistance is lowered.

One example of the manufacturing method of the cubic boron nitride sintered body of the present invention is as follows.

Titanium compound powder, $Al_3Ti$ powder, cubic boron nitride powder and paraffin are mixed. The titanium compound powder is, for example, titanium nitride, titanium carbide or titanium carbonitride.

Next, the obtained mixture is molded. The molded article is heated at a temperature of 400 to 500° C. in a vacuum at a pressure of $1.33 \times 10^{-1}$ Pa or less. According to this procedure, an organic material such as paraffin, etc., is removed from the molded article. Further, the molded article is heated at a temperature of 700 to 1000° C. in a vacuum at the same pressure. According to this procedure, preliminary sintering of the molded article is carried out.

The preliminary sintered molded article is charged in an ultrahigh-pressure and high temperature generating device, and sintered under the conditions of a pressure of 5 to 8 GPa and a temperature of 1400 to 1600° C. to obtain a cubic boron nitride sintered body of the present invention.

In the present invention, it is preferred to use $Al_3Ti$ powder as the aluminum component. By using the $Al_3Ti$ powder, formed amounts of $Al_2O_3$ and AlN can be optimized. In addition, by using the $Al_3Ti$ powder, the aluminum component can be prevented from dispersing in the titanium compound. Further, by using the $Al_3Ti$ powder, the aluminum compound can be easily contacted with the cubic boron nitride.

The cubic boron nitride sintered body and the coated cubic boron nitride sintered body of the present invention are excellent in wear resistance and fracture resistance. The cubic boron nitride sintered body and the coated cubic boron nitride sintered body of the present invention are preferably applied to a cutting tool or a wear resistant tool. Among these, it is more preferred that it is applied to a cutting tool.

Effects of the Invention

The cubic boron nitride sintered body and the coated cubic boron nitride sintered body of the present invention are excellent in fracture resistance. Therefore, when the cubic boron nitride sintered body and the coated cubic boron nitride sintered body of the present invention are used for a cutting tool or a wear resistant tool, tool life can be elongated.

EXAMPLE 1

Cubic boron nitride (cBN) powder, TiN powder, $Al_3Ti$ powder, AlN powder, Al powder and $Ti_2AlN$ powder were mixed with the ratio shown in Table 1. An average particle diameter of the cubic boron nitride (cBN) powder is 0.4, 1.2 and 2.0 μm. An average particle diameter of the TiN powder is 1.0 μm. An average particle diameter of the $Al_3Ti$ powder is 2.0 μm. An average particle diameter of the AlN powder is 1.0 μm. An average particle diameter of the Al powder is 2.0 μm. An average particle diameter of the $Ti_2AlN$ powder is 2.0 μm.

The raw powder obtained by mixing was charged in a cylinder for a ball mill with balls made of a cemented carbide, a hexane solvent and paraffin, and further mixed. The powder obtained by mixing and pulverizing with a ball mill was molded under pressure. Deparaffinization treatment of the obtained molded article was carried out under the conditions of $1.33 \times 10^{-3}$ Pa and at 450° C. The molded article subjected to the deparaffinization treatment was heated in a vacuum of the same pressure at 850° C. to carry out preliminary sintering. The obtained preliminary sintered body was charged in an ultrahigh-pressure and high temperature generating device and sintered under the conditions of a pressure of 5.5 GPa, a temperature of 1500° C. and a retention time of 30 minutes. According to this procedure, cubic boron nitride sintered bodies of Present products and Comparative products were obtained.

TABLE 1

| Sample number | Composition (vol %) |
|---|---|
| Present product 1 | 67cBN—29$Al_3Ti$—4TiN |
| Present product 2 | 59cBN—36$Al_3Ti$—5TiN |
| Present product 3 | 83cBN—15$Al_3Ti$—2TiN |
| Present product 4 | 67cBN—18$Al_3Ti$—9AlN—6TiN |
| Present product 5 | 67cBN—29$Al_3Ti$—4TiN |
| Present product 6 | 61cBN—30$Al_3Ti$—9TiN |
| Present product 7 | 60cBN—28$Al_3Ti$—12Al |
| Comparative product 1 | 67cBN—26$Al_3Ti$—7$Ti_2AlN$ |
| Comparative product 2 | 52cBN—38$Al_3Ti$—10$Ti_2AlN$ |

TABLE 1-continued

| Sample number | Composition (vol %) |
|---|---|
| Comparative product 3 | 88cBN—10$Al_3Ti$—2$Ti_2AlN$ |
| Comparative product 4 | 67cBN—10Al—23TiN |
| Comparative product 5 | 67cBN—10AlN—23TiN |
| Comparative product 6 | 66cBN—16Al—18$Ti_2AlN$ |
| Comparative product 7 | 70cBN—9Al—21$Ti_2AlN$ |
| Comparative product 8 | 58cBN—32Al—10$Ti_2AlN$ |

The composition of the cubic boron nitride sintered body was examined by subjecting to X-ray diffraction measurement of the obtained cubic boron nitride sintered body. In addition, the sectional structure of the cubic boron nitride sintered body was photographed by the SEM to measure % by volume of the cubic boron nitride (cBN) and % by volume of the binder phase. These results were shown in Table 2.

A height of the peak of the diffraction line of the cubic boron nitride sintered body was measured by using an X-ray diffractometer RINT TTRIII manufactured by RIGAKU CORPORATION. Measurement of the X-ray diffraction is carried out by 2θ/θ concentrated optical system using a Cu-Kα line. The measurement conditions are as follows.

Output: 50 kV, 250 mA
Solar slit at incident side: 5°
Divergence vertical slit: ½°
Divergence vertical limit slit: 10 mm
Scattering slit: ⅔°
Solar slit at photoreception side: 5°
Photoreception slit: 0.15 mm
BENT monochromator
Photoreception monochrome slit: 0.8 mm
Sampling width: 0.02°
Scanning speed: 2°/min From the obtained X-ray diffraction diagram, the X-ray diffraction intensity $I_1$ of the (100) plane of AlN, the X-ray diffraction intensity $I_2$ of the (104) plane of $Al_2O_3$ and the X-ray diffraction intensity $I_3$ of the (101) plane of $TiB_2$ were obtained. Further, the ratio of $I_1$ to $I_2$ ($I_1/I_2$) and the ratio of $I_3$ to $I_1$ ($I_3/I_1$) were obtained. The ratios of the X-ray diffraction intensities can be obtained by the ratio of the heights of the peaks. These values were shown in Table 3.

An average grain diameter of the cubic boron nitride contained in the cubic boron nitride sintered body was obtained by image analysis. Specifically, the sectional surface of the cubic boron nitride sintered body was photographed by the SEM. The photographed image was analyzed by using a commercially available image analysis software.

More specifically, by using the SEM, a reflected electron image with 5,000-fold of the sectional surface of the cubic boron nitride sintered body was photographed. By using the energy dispersive X-ray spectroscopy (EDS) attached to the SEM, it was confirmed that the cubic boron nitride is black, the Al compound is dark gray and the Ti compound is light gray. Next, by using the commercially available image analysis software, a diameter of a circle the area of which is equal to that of the black cubic boron nitride was obtained. This diameter of a circle was used as a grain diameter of the cubic boron nitride. An average value of the grain diameters of the cubic boron nitride existing in the sectional surface of the cubic boron nitride sintered body was obtained. The average values were shown in Table 3.

The cubic boron nitride sintered body contains the cubic boron nitride and the Al compound. An area of the region at which the cubic boron nitride and the Al compound are continuously contacted can be obtained from the photograph of the sectional structure of the cubic boron nitride sintered body photographed by the SEM. Specifically, by analyzing the photograph of the sectional structure of the cubic boron nitride sintered body with the commercially available image analysis software, the area of the region at which the cubic boron nitride and the Al compound are continuously contacted can be obtained.

Specifically, by using the SEM, a reflected electron image with 5,000-fold of the sectional surface of the cubic boron nitride sintered body is photographed. In the sectional structure, black cubic boron nitride, dark gray Al compound and light gray Ti compound can be observed. A total area S1 of the black cubic boron nitride and the dark gray Al compound is obtained.

An area of the Al compound which is not contacted with the cubic boron nitride and an area of the cubic boron nitride which is not contacted with the Al compound are deducted from the above-mentioned total area S1 to find the remainder. This remainder corresponds to "the area of the region at which the cubic boron nitride and the Al compound are contacted." Next, among the area of the region at which the cubic boron nitride and the Al compound are contacted, the maximum area is obtained. This maximum area corresponds to "the area S2 of the region at which the cubic boron nitride and the Al compound are continuously contacted."

A ratio of the area S2 of the region at which the cubic boron nitride and the Al compound are continuously contacted to the total area S1 of the cubic boron nitride and the Al compound (=S2/S1) are shown in Table 3.

TABLE 2

| | Cubic boron nitride sintered body | | | | |
|---|---|---|---|---|---|
| | | Binder phase | | | |
| | | Ti compound | | Al compound | | |
| Sample number | CBN Content (vol %) | XRD diffraction measurement | Content (vol %) | XRD diffraction measurement | Content (vol %) | $S_T/S_A$ |
| Present product 1 | 60 | TiN, TiB$_2$ | 28 | AlN, Al$_2$O$_3$ | 12 | 2.3 |
| Present product 2 | 52 | TiN, TiB$_2$ | 34 | AlN, Al$_2$O$_3$ | 14 | 2.4 |
| Present product 3 | 78 | TiN, TiB$_2$ | 15 | AlN, Al$_2$O$_3$ | 7 | 2.1 |
| Present product 4 | 60 | TiN, TiB$_2$ | 28 | AlN, Al$_2$O$_3$ | 12 | 2.3 |
| Present product 5 | 60 | TiN, TiB$_2$ | 28 | AlN, Al$_2$O$_3$ | 12 | 2.3 |
| Present product 6 | 52 | TiN, TiB$_2$ | 36 | AlN, Al$_2$O$_3$ | 12 | 3.0 |
| Present product 7 | 60 | TiN, TiB$_2$ | 20 | AlN, Al$_2$O$_3$ | 20 | 1.0 |
| Comparative product 1 | 60 | TiN, TiB$_2$ | 28 | AlN, Al$_2$O$_3$ | 12 | 2.3 |
| Comparative product 2 | 45 | TiN, TiB$_2$ | 38 | AlN, Al$_2$O$_3$ | 17 | 2.2 |
| Comparative product 3 | 85 | TiN, TiB$_2$ | 10 | AlN, Al$_2$O$_3$ | 5 | 2.0 |
| Comparative product 4 | 60 | TiN, TiB$_2$ | 28 | AlN, Al$_2$O$_3$ | 12 | 2.3 |
| Comparative product 5 | 60 | TiN, TiB$_2$ | 28 | AlN, Al$_2$O$_3$ | 12 | 2.3 |
| Comparative product 6 | 60 | TiN, TiB$_2$ | 28 | AlN, Al$_2$O$_3$ | 12 | 2.3 |
| Comparative product 7 | 60 | TiN, TiB$_2$ | 32 | AlN, Al$_2$O$_3$ | 8 | 4.0 |
| Comparative product 8 | 60 | TiN, TiB$_2$ | 18 | AlN, Al$_2$O$_3$ | 22 | 0.8 |

TABLE 3

| | Cubic boron nitride sintered body | | | | |
|---|---|---|---|---|---|
| Sample number | Average grain diameter of cBN (μm) | $I_1/I_2$ | $I_3/I_1$ | Thermal conductivity (W/m · K) | S2/S1 |
| Present product 1 | 0.4 | 15.2 | 1.4 | 75 | 0.988 |
| Present product 2 | 0.4 | 13.4 | 0.8 | 65 | 0.991 |
| Present product 3 | 0.4 | 14.2 | 1.7 | 93 | 0.981 |
| Present product 4 | 0.4 | 35.0 | 1.0 | 79 | 0.989 |
| Present product 5 | 1.2 | 17.8 | 1.2 | 81 | 0.992 |
| Present product 6 | 0.4 | 10.3 | 0.9 | 63 | 0.987 |
| Present product 7 | 0.4 | 8.3 | 1.8 | 74 | 0.998 |
| Comparative product 1 | 0.4 | 9.5 | 3.2 | 55 | 0.908 |
| Comparative product 2 | 0.4 | 7.5 | 1.7 | 42 | 0.885 |
| Comparative product 3 | 0.4 | 5.6 | 1.6 | 61 | 0.966 |
| Comparative product 4 | 0.4 | 5.0 | 4.2 | 53 | 0.989 |
| Comparative product 5 | 0.4 | 50.0 | 0.6 | 57 | 0.982 |
| Comparative product 6 | 2.0 | 19.5 | 1.1 | 57 | 0.920 |
| Comparative product 7 | 0.4 | 10.3 | 1.2 | 52 | 0.902 |
| Comparative product 8 | 0.4 | 26.0 | 1.5 | 56 | 0.974 |

Present products and Comparative products were processed to a cutting tool with an insert shape determined by the ISO standard CNGA120408. By using the obtained cutting tools, the following mentioned Cutting tests (1) and (2) were carried out. The results are shown in Table 4.

Cutting Test (1)
External continuous dry Cutting (Turning),
Work piece material: SCM415H (HRC 60.9 to 61.7),
Shape of work piece material: Columnar shape having φ48 mm×L 200 mm with 90° two V-grooves,
Cutting speed: 100 m/min,
Depth of cut: 0.15 mm,
Feed rate: 0.15 mm/rev,
Tool life: Cutting time until fractured.

Cutting Test (2)
Face interrupted dry Cutting (Turning),
Work piece material: SCM415H (HRC 60.9 to 61.7),
Shape of work piece material: A disc having φ180 mm×L 20 mm with two grooves having a width of 15 mm (Work piece material has a hole with φ45 mm at the center of the disc),
Cutting speed: 100 m/min,
Depth of cut: 0.2 mm,
Feed rate: 0.1 mm/rev,
Tool life: Cutting time until fractured.

TABLE 4

| Sample number | Cutting test (1) Tool life (min) | Cutting test (2) Tool life (min) |
|---|---|---|
| Present product 1 | 18 | 26 |
| Present product 2 | 14 | 21 |
| Present product 3 | 17 | 23 |
| Present product 4 | 19 | 25 |
| Present product 5 | 19 | 23 |
| Present product 6 | 14 | 19 |
| Present product 7 | 16 | 24 |
| Comparative product 1 | 9 | 11 |
| Comparative product 2 | 7 | 9 |
| Comparative product 3 | 10 | 11 |
| Comparative product 4 | 7 | 16 |
| Comparative product 5 | 8 | 15 |
| Comparative product 6 | 10 | 10 |
| Comparative product 7 | 9 | 12 |
| Comparative product 8 | 8 | 11 |

The cubic boron nitride sintered bodies of Present products have higher thermal conductivity as compared with those of the cubic boron nitride sintered bodies of Comparative products, and progress of the chemical reaction wear at the time of cutting has been suppressed. In addition, Present products were improved in fracture resistance, and had longer tool life as compared with those of Comparative products.

EXAMPLE 2

A coating treatment was carried out onto the surface of Present products 1 to 7 of Example 1 using a PVD device.

A TiN film with an average film thickness of 3 μm was each coated onto the surface of the cubic boron nitride sintered bodies of Present products 1 to 4. Present products 1 to 4 onto which the TiN film had been coated are called to as Present products 8 to 11, respectively.

A TiAlN film with an average film thickness 3 μm was each coated onto the surface of the cubic boron nitride sintered bodies of Present products 5 to 7. Present products 5 to 7 onto which the TiAlN film had been coated are called to as Present products 12 to 14, respectively.

The same Cutting tests (1) and (2) as in Example 1 were carried out by using Present products 8 to 14. The results are shown in Table 5.

TABLE 5

| Sample number | Cutting test (1) Tool life (min) | Cutting test (2) Tool life (min) |
|---|---|---|
| Present product 8 | 28 | 31 |
| Present product 9 | 24 | 26 |
| Present product 10 | 27 | 28 |
| Present product 11 | 29 | 30 |
| Present product 12 | 27 | 33 |
| Present product 13 | 22 | 29 |
| Present product 14 | 24 | 34 |

Present products 8 to 14 in which a film (a TiN film, a TiAlN film) has been coated had longer tool lives than those of Present products 1 to 7 to which no film has been coated.

UTILIZABILITY IN INDUSTRY

The cubic boron nitride sintered body and the coated cubic boron nitride sintered body of the present invention are excellent in fracture resistance, in particular, when they are used as a cutting tool or a wear resistant tool, tool life can be elongated so that they have high utilizability in industry.

The invention claimed is:

1. A cubic boron nitride sintered body comprising:
   cubic boron nitride, a binder phase and inevitable impurities,
   an amount of the cubic boron nitride is 50% by volume or more and 80% by volume or less,
   a total amount of the binder phase and the inevitable impurities is 20% by volume or more and 50% by volume or less,
   the binder phase contains an Al compound and a Ti compound,
   the Al compound contains an Al element and at least one element selected from the group consisting of N, O and B,
   the Ti compound contains a Ti element and at least one element selected from the group consisting of C, N and B,
   the Al compound contains AlN and $Al_2O_3$,
   when an X-ray diffraction intensity at a (100) plane of the AlN is given by $I_1$, and an X-ray diffraction intensity at a (104) plane of the $Al_2O_3$ is given by $I_2$, then $I_1/I_2$ is 6 or more and 40 or less, and
   when a total area of the cubic boron nitride and the Al compound is given by S1, and an area of a region at which the cubic boron nitride and the Al compound are continuously contacted is given by S2, then S2/S1 is 0.98 or more and 1.00 or less.

2. The cubic boron nitride sintered body according to claim 1, wherein:
   the Ti compound contains $TiB_2$, and
   when an X-ray diffraction intensity at a (101) plane of the $TiB_2$ is given by $I_3$, then $I_3/I_1$ is 0.5 or more and 2.0 or less.

3. The cubic boron nitride sintered body according to claim 1, wherein an area of the Al compound is given by $S_A$, and an area of the Ti compound is given by $S_T$, then $S_T/S_A$ is 1 or more and 3 or less.

4. The cubic boron nitride sintered body according to claim 1, wherein an average grain diameter of the cubic boron nitride is 0.3 μm or more and 1.5 μm or less.

5. The cubic boron nitride sintered body according to claim 1, wherein:
   the Ti compound contains $TiB_2$;
   when an X-ray diffraction intensity at a (101) plane of the $TiB_2$ is given by $I_3$, then $I_3/I_1$ is 0.5 or more and 2.0 or less;
   an area of the Al compound is given by $S_A$, and
   an area of the Ti compound is given by $S_T$, then $S_T/S_A$ is 1 or more and 3 or less; and
   an average grain diameter of the cubic boron nitride is 0.3 μm or more and 1.5 μm or less.

6. A coated cubic boron nitride sintered body comprising:
   the cubic boron nitride sintered body according to claim 1; and
   a film formed on a surface of the cubic boron nitride sintered body.

7. The coated cubic boron nitride sintered body according to claim 6, wherein the film comprises:
   at least one element selected from the group consisting of Ti, Zr, Hf, V, Nb, Ta, Cr, Mo, W, Al and S1, and
   at least one element selected from the group consisting of C, N, O and B.

8. The coated cubic boron nitride sintered body according to claim 6, wherein the film is a single layer film or a laminated film containing two or more layers.

9. The coated cubic boron nitride sintered body according to claim 6, wherein an average film thickness of the film is 0.5 µm or more and 20 µm or less.

10. The coated cubic boron nitride sintered body according to claim 6, wherein:
   an average film thickness of the whole film is 0.5 µm or more and 20 µm or less; and
   the film comprises:
      at least one element selected from the group consisting of Ti, Zr, Hf, V, Nb, Ta, Cr, Mo, W, Al and S1, and
      at least one element selected from the group consisting of C, N, O and B.

11. The coated cubic boron nitride sintered body according to claim 10, wherein:
   the film is a laminated film containing two or more layers.

* * * * *

UNITED STATES PATENT AND TRADEMARK OFFICE
CERTIFICATE OF CORRECTION

PATENT NO. : 9,950,962 B2
APPLICATION NO. : 15/030134
DATED : April 24, 2018
INVENTOR(S) : Kota Kobayashi Page 1 of 1

It is certified that error appears in the above-identified patent and that said Letters Patent is hereby corrected as shown below:

Claim 7, Column 12, Line 62:
Please delete "S1" after --Al and--, and before --, and--.
Please insert --Si-- after --Al and--, and before --, and--.

Claim 10, Column 13, Line 10:
Please delete "S1" after --Al and--, and before --, and--.
Please insert --Si-- after --Al and--, and before --, and--.

Signed and Sealed this
Seventh Day of August, 2018

Andrei Iancu
*Director of the United States Patent and Trademark Office*